Patented Mar. 9, 1954

2,671,807

UNITED STATES PATENT OFFICE

2,671,807

PREPARATION OF N-ALKYL AROMATIC AMINES

William W. Prichard, Wilmington, Del., assignor to E. I. du Pont de Nemours and Company, Wilmington, Del., a corporation of Delaware No Drawing. Application June 14, 1950, Serial No. 168,150

4 Claims. (Cl. 260—577)

This invention relates to the preparation of N-alkylated aromatic amines.

N-alkylated aromatic amines are of interest as intermediates and have in general hitherto been obtained by pocesses involving a plurality of steps.

This invention has as an object a one-step process for the preparation of N-alkylated aromatic amines. Other objects will appear hereinafter.

These objects are accomplished by the process of this invention wherein a nitro-aromatic compound is reacted, at a temperature of at least 175° C. and a pressure of at least 250 atmospheres, with carbon monoxide and hydrogen.

In practicing the reductive alkylation of this invention as a batch operation, a pressure reactor is charged with the nitro-aromatic compound and metal carbonyl containing catalyst. The reactor is deoxygenated by evacuation, while the reaction mixture is cooled to 0° C., or by sweeping with purified nitrogen. The reactor is then pressured to a specific level with a carbon monoxide/hydrogen gas mixture of pre-determined composition and the reaction mixture heated at a temperature in the range of 175° C. to 300° C. for from five to twenty hours, during which time the pressure within the reactor is maintained, if desired, by repressuring with the hydrogen/carbon monoxide gas mixture. Thereafter the reaction mixture is permitted to cool, the reactor is opened and the contents discharged. The desired N-alkyl aromatic amines are isolated from the product by distillation or other means known to those skilled in the art.

The following examples in which parts are by weight are illustrative of the invention.

Example I

A 400 cc. silver-lined shaker tube was charged with 11.3 g. of nitrobenzene, 105 g. of methanol and 108 g. of a butadiene-cobalt carbonyl hydride adduct prepared as set forth in the copending application of William W. Prichard, Serial No. 779,837, filed October 14, 1947. The air in the tube was displaced by flushing with purified nitrogen and carbon monoxide forced in to the tube to a pressure of 200 atmospheres. Hydrogen was then introduced until the total pressure was 500 atmospheres. The temperature was raised to 230° C. at which temperature a sudden pressure drop was noted. During five hours at 230–235° C. a decrease in pressure from 775 atmospheres to 360 atmospheres was observed. The tube was cooled, the gases vented and the liquid contents discharged. The product weighed 128 g., of which 11.3 g. was a water-insoluble, acid-soluble oil which distilled from 77–116° C. at a pressure of 7.5 mm. of mercury. By reaction with benzenesulfonyl chloride, an oily benzenesulfonamide derivative was prepared which was insoluble in alkali and was therefore the benzenesulfonamide of a secondary amine.

The butadiene-cobalt carbonyl hydride adduct used as the catalyst in the above example was prepared as follows:

A silver-lined pressure reactor of 400 cc. capacity was charged with 30.6 grams (0.0895 mole) of dicobalt octacarbonyl $Co_2(CO)_8$ and 100 grams (1.67 moles) of isopropanol. The reactor was pressured to 100 atmospheres with carbon monoxide, heated to 130° C., and then butadiene was continuously injected at such rate that 10 grams (0.185 mole) of butadiene was introduced during 30 minutes. The reactor was maintained at 130° C. for an additional 30 minutes and then cooled. When discharged in a nitrogen atmosphere, 135 grams of dark colored liquid was recovered from the reactor. This liquid was distilled under nitrogen, the pressure being so adjusted that the distillation vessel temperature did not exceed 50° C. After removal of the solvent, the pressure was lowered to 2 mm. and 11.2 grams of orange red liquid butadiene-cobalt carbonyl adduct distilled and was collected at 32 to 33° C. under this pressure. The product was stable at room temperature under a nitrogen blanket but when exposed to air it reacted rapidly with oxygen to give a black tarry mass. Analysis of the butadiene-cobalt carbonyl adduct showed it to contain 25.58 and 25.88% cobalt (calculated for $C_8H_7O_4Co$: Co 26.11%).

Example II

A mixture of 10 g. of nitrobenzene, 90 g. of methanol, and 1 g. cobalt carbonyl was reacted as described in Example I, except that the reaction was run at 250° C. and 1000 atmospheres total pressure, the pressure being maintained by periodic injection of a 2:1 mole ratio hydrogen/carbon monoxide gas mixture. During about 15 hours a cumulative pressure drop of 635 atmospheres was observed. The reaction mixture after removal from the bomb weighed 125.9 g. Non-amine by-products were removed by steam distillation from acid solution. The amines, liberated when the residue was made strongly alkaline, comprisesd 10.0 g. and distilled from 190–280° C. at atmospheric pressure.

A composite product from several preparations made according to this procedure was separated by the Hinsberg method (Ber. 23, 1963 (1890); ibid. 38, 906 (1905)) into primary, secondary and tertiary amines using p-toluenesulfonyl chloride. From 47.5 g. of mixed amines there was obtained 0.8 g. of primary amine sulfonamides, 18.0 g. of secondary amine sulfonamides and 38.2 g. of tertiary amines. The tertiary amines boiled from 208–265° C. at atmospheric pressure. Titration of the various fractions thus obtained with acid indicated C/N ratios ranging from 10 to 18.6.

*Example III*

A mixture containing 5 g. of 2,4-dinitrodiphenylamine, 95 g. of methanol, and 1 g. of cobalt carbonyl was treated as in Example II. The weight of the crude reaction mixture was 117.9 g., of which 2.1 g. were alkyl substituted amines. The neutral equivalent of the amine fraction was 264.

*Example IV*

A mixture of 10 g. of nitrobenzene, 90 g. of methanol, and 1 g. of nickel carbonyl (Ni(CO)$_4$) was reacted as described in Example I, except that the reaction was conducted at 250° C. and 1000 atmospheres total pressure with a 2:1 mole ratio H$_2$/CO gas mixture. Throughout the reaction the pressure was maintained by periodic injections of the 2:1 H$_2$/CO gas mixture. The reaction mixture, after removal from the reactor, weighed 98 g. From the crude product there was separated, by steam distillation and ether extraction, 6.9 g. of amines boiling at 184° to 201° C. at atmospheric pressure. Infrared analysis of the amine fraction boiling at 196 to 201° C. showed the presence of ethyl substituents.

*Example V*

A silver-lined pressure vessel of 400 cc. capacity was flushed with nitrogen, charged with 3 grams of ruthenium dioxide, 10 grams of nitrobenzene, and 79 grams of methanol, evacuated and cold pressured to 500 atmospheres with a mixture of hydrogen and carbon monoxide in the mole ratio of 2:1. The vessel was agitated and maintained at 200° C. for 14 hours, during which time the pressure was maintained at 700 to 1000 atmospheres by repressuring periodically with the same gas mixture. At the completion of the run, the vessel was cooled, vented, and its contents discharged.

A wax and the catalyst were separated from the reaction products by filtration and washed with methanol. The filtrate and methanol wash were heated under reflux with 57 grams of concentrated hydrochloric acid for a period of 21 hours. The acid solution was distilled until the distillate temperature reached 99° C., in order to remove low boiling neutral or acidic oils. The acid residue was extracted several times with ether to remove high boiling neutral or acidic oils. The acidic aqueous solution was saturated with potassium hydroxide and extracted several times with ether. The ether solution was dried over magnesium sulfate and distilled. The product amounted to 2.1 grams, B. P. 98–108° C. (2 mm.), percent N, 8.21, 8.18. The residue after distillation amounted to 0.5 gram.

*Example VI*

A mixture of 10 g. of nitrobenzene, 90 g. of methanol, and 2 g. of the mercury salt of cobalt carbonyl hydride, (Hg[Co(CO)$_4$]$_2$), was reacted as described in Example I, except that the reaction was conducted at 250° C. and 1000 atmospheres total pressure with a 1:1 mole ratio H$_2$/CO gas mixture. Throughout the reaction the pressure was maintained by periodic injections with the hydrogen/carbon monoxide gas mixture. The product, after removal from the reactor, weighed 175 g. From the product there was separated 8.3 g. of amines boiling at 240° to 306° C.

The examples have illustrated certain conditions of temperature, pressure, catalyst concentration, carbon monoxide/hydrogen mixed gas composition, etc. It is to be understood that these are interdependent variables and that variation in one requires compensating adjustments in the others. Increase in temperature generally allows the use of lower pressures. An increase in catalyst concentration generally operates to reduce the temperature and pressure requirements.

The working examples have illustrated batch operation. The process however may be carried out either as a continuous or semi-continuous operation.

Whether for batch or semi-continuous or continuous operation, the desired mixtures of hydrogen and carbon monoxide are made up on the basis of pressures, calculated by the method of successive approximations using the following equation:

$$P_{\text{(initial CO)}} = \frac{(C_{\text{initial CO}})(P_{\text{final}})}{(C_{\text{final CO}}) + N(C_{\text{final H}_2})}$$

where P stands for pressure, C stands for the compressibility of the carbon monoxide and of the hydrogen at the indicated pressure, and N is the desired hydrogen/carbon monoxide mole ratio in the mixture.

The mole ratio of hydrogen to carbon monoxide in the gas mixture may vary from 5:1 to 1:2.

The temperatures at which the reductive alkylation of the nitro-aromatic compound is effected can vary from 175° to 300° C. Since good reaction rates, with good yields of desired N-alkyl aromatic amines, are obtained in the range of 190° to 275° C. that is the temperature range generally employed.

The process is generally operated under a total pressure in excess of 250 atmospheres. The upper pressure at which the process can be operated is determined only by the structural limitations of the equipment used. Since optimum results from the standpoint of yield and reaction rate are realized when the process is operated under a total pressure of from 500 to 1500 atmospheres, this range embraces the preferred pressure conditions. These pressures may be attained either by injecting into the reactor mixed hydrogen/carbon monoxide gas of predetermined composition or by injecting the hydrogen and carbon monoxide separately until the desired total pressure is attained.

A solvent or diluent is not necessary, but one may be employed, if desired. Suitable solvents are methanol, ethanol, methyl acetate, benzene; saturated hydrocarbons such as cyclohexane, naphtha and the like; ethers such as dioxane, diethyl ether, and the like. Of these, methanol is the preferred solvent because of its low cost, availability, and the generally good results obtained therewith. The amount of solvent used can vary up to 95% by weight of the total reaction mixture. A solvent may be advantageously employed in those instances where the reaction is highly exothermic.

The catalysts used in the practice of this invention are carbonyls of group VIII metals having atomic numbers of 27 through 44 and the derivatives of these carbonyls, such as the hydrides, salts, and adducts with diene hydrocarbons. These carbonyls may be preformed or they may be formed in situ in the reaction mixture from the free metals or from salts of the metals. General methods applicable to the preparation of metal carbonyls are:

(1) Direct reaction of carbon monoxide with the metal in reactive form.

(2) Reaction of a salt of the metal with carbon monoxide. Thus, by reaction of a complex cyanide of the metal with carbon monoxide or by reaction of a metal cyanide, suspended in sodium hydroxide, with carbon monoxide. In place of the cyanide there can be used a metal mercaptide or an inorganic and organic thio salt of the metal such as the thiosalicylate, xanthate, etc.

(3) Reaction of a salt of the metal with carbon monoxide at high pressures.

A typical preparation of a cobalt carbonyl is the following (J. Am. Chem. Soc. 70, 383–6 (1940)):

Alloy skeleton cobalt (4 to 8 grams) was placed with 145 grams of diethyl ether under carbon monoxide at 3200 lbs./in.$^2$ pressure and heated with shaking for five to six hours at 150° C., after which the reaction vessel was allowed to cool. The pressure dropped during the period of heating from 4900 to 4300 lbs./in.$^2$ and then to 2200 lbs./in.$^2$, when the reactor was cooled to room temperature. The insoluble portion of the reaction mixture was removed by centrifugation. The clear, reddish liquid recovered measured 160 cc. and it contained 8.9 grams of dicobalt octacarbonyl.

The group VIII metals of atomic number 27 through 44 are cobalt, nickel, and ruthenium. Of these, the preferred catalysts are those in which cobalt carbonyl is present as an essential component because of the ease with which they are prepared and because of their high catalytic effectiveness.

The amount of metal carbonyl employed is important in determining the chain length of the alkyl substituent in the N-alkyl-substituted aromatic amine. Thus, using low amounts of catalyst, e. g., in the range of 0.5 to 5% by weight of the aromatic nitro compound, the reaction product preponderates in short chain N-alkyl-substituted amines, e. g., N-methyl- and N-ethyl to N-butylamines. Employing amounts of catalyst, of the order of 5 to 15% by weight of the aromatic nitro compound, causes the reaction to proceed to the production of long-chain N-alkyl-substituted amines, i. e., amines in which the alkyl substituents contain a total of from 5 to 15 carbon atoms. The use of amounts of metal carbonyl in excess of 20%, by weight of the aromatic nitro compound, leads to no advantage either in reaction rate improvement or in yield of desired N-alkl-substituted aromatic amines.

The reductive alkylation of the aromatic nitro compound is considered to be complete when there is no further observed pressure drop. This generally requires from 5 to 20 hours.

While the process is generally applicable to aromatic nitro compounds, i. e., nitro compounds having the nitro group on nuclear carbon, it finds its greater utility in its application to aryl nitro compounds, i. e., aromatic compounds in which the aryl group is wholly hydrocarbon and in which the nitro group, or groups, is attached directly to a nuclear carbon atom. Of these, the mononitrohydrocarbons having not more than two aromatic rings are preferred. In addition to the nitrobenzene and 2,4-dinitrodiphenylamine of the examples there can be used in place thereof dinitrobenzenes, nitrotoluene, dinitrotoluenes, dinitroxylenes, nitronaphthalene, dinitronaphthalenes, nitro- and dinitrodiphenyls, nitrodiphenylamines, and the like.

This invention is of advantage in providing a simple one-step process for converting aromatic nitro compounds to N-alkyl-substituted aromatic amines in high yields. By suitable variations in the conditions, e. g., change in ratio of carbon monoxide to hydrogen, the process can be adjusted to produce preponderant amounts of the N-monoalkyl or the N-dialkyl-substituted aromatic amines. These amines may be used for example as corrosion inhibitors for metal surfaces, in the formulation of wetting agents and dry cleaning assistants, and as intermediates in the preparation of rubber chemicals and textile treating agents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of N-alkylated aromatic amino compounds having N-alkyl groups of 5 to 15 carbons wherein an aromatic nitrohydrocarbon having not more than two aromatic rings and having the nitro group on nuclear carbon is reacted, at a temperature of 175–300° C. and a pressure of 250–1500 atmospheres, with a mixture of hydrogen and carbon monoxide in mole ratio varying from 5:1 to 1:2, in the presence of 5 to 15%, by weight of the aromatic nitrohydrocarbon, of a catalyst consisting essentially of a carbonyl of an eighth group element of atomic number between 27 and 44 and isolating such N-alkylated aromatic amino compound.

2. A process for the preparation of N-alkylated aromatic amino compounds having N-alkyl groups of 5 to 15 carbons wherein a nitro-aromatic compound having not more than two carbocyclic aromatic rings and having each nitro group on carbon of a carbocyclic aromatic ring is reacted, at a temperature of 175–300° C. and a pressure of 250–1500 atmospheres, with a mixture of hydrogen and carbon monoxide, in mole ratio varying from 5:1 to 1:2, in the presence of 5 to 15%, by weight of the aromatic nitro compound, of a catalyst consisting essentially of a carbonyl of an eighth group element selected from the class consisting of nickel, cobalt, and ruthenium and isolating such N-alkylated aromatic amino compound.

3. Process of claim 1 wherein the nitro compound is a mononitrohydrocarbon having not more than two aromatic rings.

4. Process of claim 1 wherein the catalyst consists essentially of cobalt carbonyl.

WILLIAM W. PRICHARD.

References Cited in the file of this patent

UNITED STATES PATENTS

| Number | Name | Date |
|---|---|---|
| 2,045,574 | Adkins et al. | June 30, 1936 |
| 2,111,469 | Francon | Mar. 15, 1938 |
| 2,292,879 | Kise | Aug. 11, 1942 |
| 2,518,754 | Clark | Aug. 15, 1950 |